United States Patent
Duan et al.

(10) Patent No.: US 9,804,821 B2
(45) Date of Patent: Oct. 31, 2017

(54) INTERACTION HISTORY MANAGEMENT DEVICE, INTERACTION DEVICE AND INTERACTION HISTORY MANAGEMENT METHOD

(71) Applicant: CLARION CO., LTD., Saitama (JP)

(72) Inventors: Qingzhu Duan, Tokyo (JP); Takaaki Sekiguchi, Tokyo (JP); Yasushi Nagai, Tokyo (JP)

(73) Assignee: CLARION, CO., LTD., Saitama (JP)

( * ) Notice: Subject to any disclaimer, the term of this patent is extended or adjusted under 35 U.S.C. 154(b) by 337 days.

(21) Appl. No.: 14/633,725

(22) Filed: Feb. 27, 2015

(65) Prior Publication Data

US 2015/0254059 A1 Sep. 10, 2015

(30) Foreign Application Priority Data

Mar. 6, 2014 (JP) ................. 2014-043918

(51) Int. Cl.
| | |
|---|---|
| G06F 3/16 | (2006.01) |
| G06Q 10/10 | (2012.01) |
| G06F 3/0482 | (2013.01) |
| G06F 3/0484 | (2013.01) |

(52) U.S. Cl.
CPC ............ *G06F 3/167* (2013.01); *G06F 3/0482* (2013.01); *G06F 3/04847* (2013.01); *G06Q 10/109* (2013.01)

(58) Field of Classification Search
CPC .......... G06F 3/16; G06F 3/167; G06F 3/0482; G06F 3/04847; G06Q 10/109
USPC ........................................ 715/716, 727, 728
See application file for complete search history.

(56) References Cited

U.S. PATENT DOCUMENTS

2008/0201135 A1 8/2008 Yano
2011/0246203 A1 10/2011 Byrne et al.

FOREIGN PATENT DOCUMENTS

EP 1076288 A2 * 2/2001 ............... G06F 3/16
JP 2004-179914 A 6/2004

OTHER PUBLICATIONS

European Office Action, European Patent Application No. 15157012.4, dated Jul. 27, 2015, 6 pages.

* cited by examiner

*Primary Examiner* — Andrey Belousov
(74) *Attorney, Agent, or Firm* — Volpe and Koenig, P.C.

(57) ABSTRACT

An interaction history management device includes an interaction control unit configured to accept an input of an operation by audio and generate a reply by audio in response to the operation, an interaction history storage unit configured to store information that identifies an audio content of the accepted operation and information that identifies an audio content of the reply, an execution unit configured to store an identifier to the interaction history storage unit as associating with the reply when a predetermined process related to the accepted operation is executed normally, and an external data deletion unit configured to, when an instruction to delete information used in the predetermined process is accepted, delete the information, identify an identifier of the predetermined process in which the information to be deleted is used, and delete at least the audio content of the reply associated with the identifier from the interaction history storage unit.

8 Claims, 16 Drawing Sheets

FIG. 4

231 EXTERNAL SERVICE EXECUTION RULE STORAGE UNIT

| SERVICE IDENTIFIER (231a) | SERVICE NAME (231b) | EXTERNAL DATA MANAGEMENT ITEM (231c) | EXTERNAL DATA MANAGEMENT NON-NECESSITY ITEM (231d) | MANAGEMENT PARAMETER (231e) |
|---|---|---|---|---|
| 16 | PERSONAL CALENDAR | ADD SCHEDULE, CHANGE SCHEDULE | READ SCHEDULE, DELETE SCHEDULE | mycalenderID, modify_ID |
| 17 | BUSINESS CALENDAR | ADD SCHEDULE | READ SCHEDULE, DELETE SCHEDULE | calenderID |
| 18 | TWEETING | POST TWEET | READ TWEET | messageID |

FIG. 5

232 EXTERNAL DATA MANAGEMENT
INFORMATION STORAGE UNIT

| EXTERNAL DATA IDENTIFIER (232a) | SERVICE IDENTIFIER (232b) | ADDITIONAL INFORMATION (232c) |
|---|---|---|
| 1 | 17 | calenderID:117 |
| 2 | 17 | calenderID:118 |
| 3 | 18 | messageID:1788 |

FIG. 6

233 INTERACTION HISTORY STORAGE UNIT

| INTERACTION SERIAL NUMBER (233a) | TIME (233b) | CATEGORY (233c) | CONTENT (233d) | SERVICE TYPE (233e) | EXTERNAL DATA IDENTIFIER (233f) |
|---|---|---|---|---|---|
| 1 | 2013-08-08 19:21:12 | USER | ADD AN EVENT FOR TOMORROW CALENDAR. | CALENDAR | |
| 2 | 2013-08-08 19:21:32 | INTERACTION DEVICE | ADD TO THE CALENDAR. PLEASE SAY THE TITLE AND TIME. | CALENDAR | |
| 3 | 2013-08-08 19:21:42 | USER | ADD "AN APPOINTMENT IN SHIBUYA AT 3 PM." | CALENDAR | |
| 4 | 2013-08-08 19:21:52 | INTERACTION DEVICE | ADD "AN APPOINTMENT IN SHIBUYA AT 3 PM TOMORROW" TO THE BUSINESS CALENDAR, CORRECT? | CALENDAR | |
| 5 | 2013-08-08 19:21:42 | USER | YES. | CALENDAR | |
| 6 | 2013-08-08 19:21:52 | INTERACTION DEVICE | THE SCHEDULE IS ADDED TO THE BUSINESS CALENDAR. | CALENDAR | 1 |
| 7 | 2013-08-08 19:22:12 | USER | ADD A DAY-OFF THIS FRIDAY TOO. | CALENDAR | |
| 8 | 2013-08-08 19:22:33 | INTERACTION DEVICE | "DAY-OFF" IS REGISTERED TO THE BUSINESS CALENDAR. | CALENDAR | 2 |
| 9 | 2013-08-08 19:23:52 | INTERACTION DEVICE | TRAFFIC JAM, 2 KM AHEAD. | TRAFFIC INFORMATION | |
| 10 | 2013-08-08 19:25:52 | USER | WRITE A TWEET "IT WAS A GREAT DAY." | TWEETING | |
| 11 | 2013-08-08 19:26:22 | INTERACTION DEVICE | YES. DONE! | TWEETING | 3 |

INTERACTION HISTORY MANAGEMENT DEVICE, INTERACTION DEVICE AND INTERACTION HISTORY MANAGEMENT METHOD

BACKGROUND

Technical Field

The present invention relates to a technique of an interaction history management device. The present invention claims priority to Japanese Patent Application No. 2014-043918 filed on Mar. 6, 2014, the contents of which are incorporated herein by reference in its entirety for the designated states where incorporation by reference of literature is allowed.

Related Art

JP 2004-179914 A (Patent Document 1) is a related art of the technical field. This publication discloses that "A communication terminal device includes a history storage unit for storing a dispatched or received telephone number or E-mail address as history information and storing one or more pieces of information related to the history information as additional information of the history information, and has a history display function for displaying the history information and the additional information thereof and a call-history function that uses the history information. The communication terminal device includes an operation unit, an address book storage unit configured to store plural pieces of registration information that includes, as a registration content, at least one of a telephone number and an E-mail address and name information, and a control means configured to, when the operation unit executes a predetermined operation of selecting and deleting registration information, delete the selected registration information from the address book storage unit and delete the history information and/or additional information thereof that correspond to at least one of the registration contents included in the registration information."

SUMMARY

The above technique can be applied only to a case that the plural pieces of information to be collectively deleted are included within a single database of search history. In other words, this technique can be applied only to a case that a computer can calculate the relativity of the plural pieces of information by using some calculation method which is invented based on a condition that each of the plural pieces of information to be deleted is stored as a single data structure, the data structures are disclosed, and there is no restriction to directly access the information.

An object of the present invention is to provide a technique that, when a part of an interaction history is deleted, external data used in a process based on the interaction can also be deleted.

This application includes multiple means to solve at least a part of the above problem, and one of the examples is as follows. In order to solve the above problem, an interaction history management device according to the present invention includes: an interaction control unit configured to accept an input of an operation by audio and generate a reply by audio in response to the operation; an interaction history storage unit configured to store information that identifies an audio content of the operation accepted by the interaction control unit and information that identifies an audio content of the reply generated by the interaction control unit; an execution unit configured to execute a predetermined process related to the operation accepted by the interaction control unit and, when the process is executed normally, store a unique identifier to the interaction history storage unit as associating with the reply generated by the interaction control unit; and an external data deletion unit configured to, when accepting an instruction to delete information used in the predetermined process by the execution unit, delete the information, identify the identifier of the predetermined process in which the information to be deleted is used, and delete at least an audio content of the reply associated with the identified identifier from the interaction history storage unit.

According to the present invention, when a part of an interaction history is deleted, external data used in a process based on the interaction can also be deleted. The problems, configurations, and effects other than the above will be made clear by explanations of the following embodiment.

BRIEF DESCRIPTION OF DRAWINGS

FIG. 4 is a diagram illustrating a data structure stored in an external service execution rule storage unit;

FIG. 5 is a diagram illustrating a data structure stored in an external data management information storage unit;

FIG. 6 is a diagram illustrating a data structure stored in an interaction history storage unit;

DETAILED DESCRIPTION

Hereinafter, an example of an interaction history management system 1 being applied with an embodiment according to the present invention will be explained with reference to the drawings.

Figure 1:
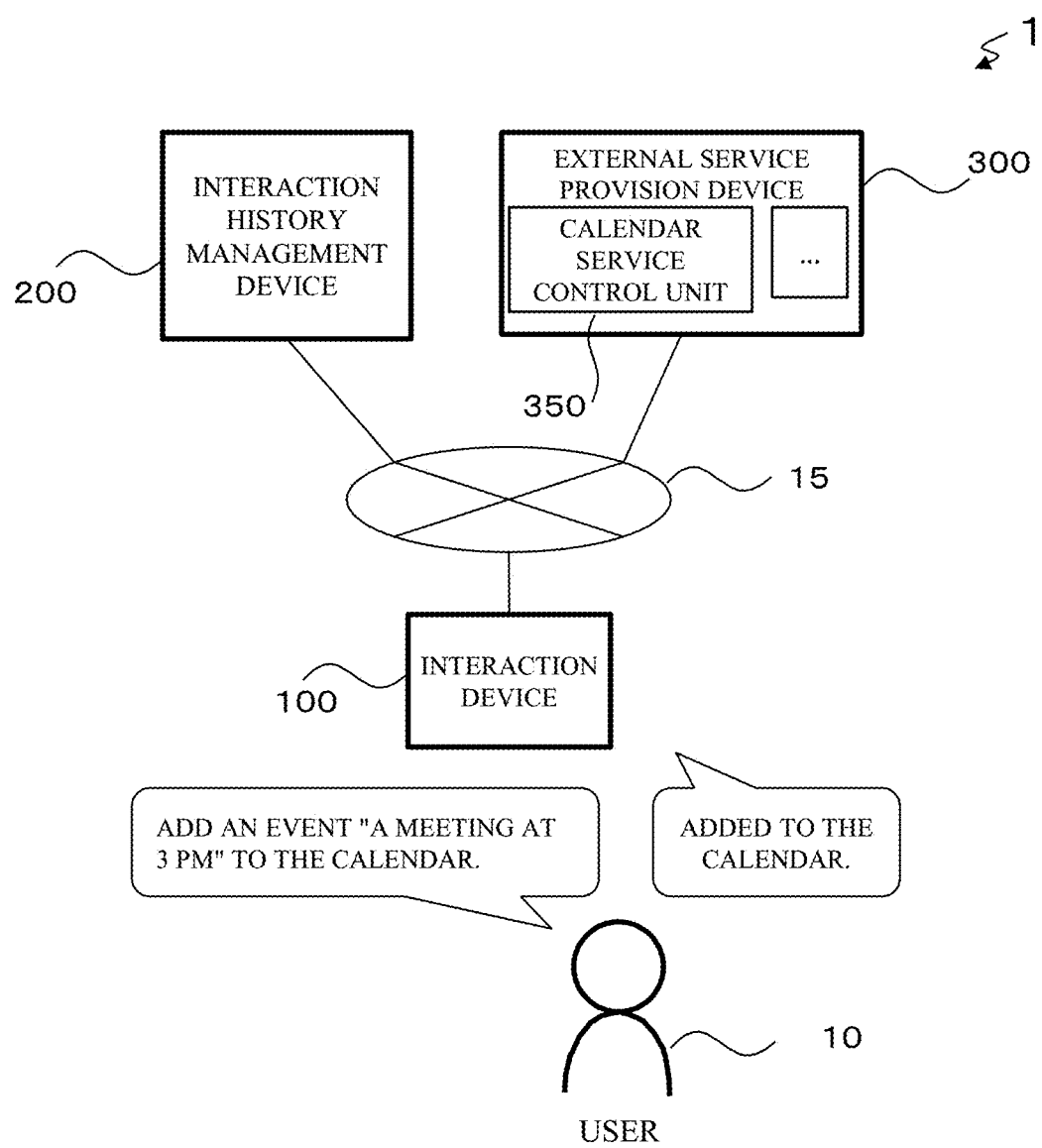
FIG. 1 is a diagram illustrating a configuration example of an interaction history management system according to an embodiment of the present invention.

FIG. 1 is a diagram illustrating a configuration example of an entire interaction history management system being applied with a first embodiment of the present invention. The interaction history management system 1 includes an interaction device 100, an interaction history management device 200 that can communicate with the interaction device 100 via a network 15 including a LAN (Local Area Network), a WAN (Wide Area Network), a VPN (Virtual Private Network) or the like, and an external service provision device 300. Here, in the present embodiment, an external service represents information processing other than the interaction function realized by the interaction device 100 and the interaction history management device 200. Concretely, the external service includes a calendar service that associates and stores date and time with events to provide a list of schedule, a schedule search, a resource competition or the like, a short sentence posting service that allows the customer to post tweet information in a predetermined character string length for example and interact with other customers within a predetermined range, and the like. Further, external data represents data generated or managed by the external service.

Figure 2:
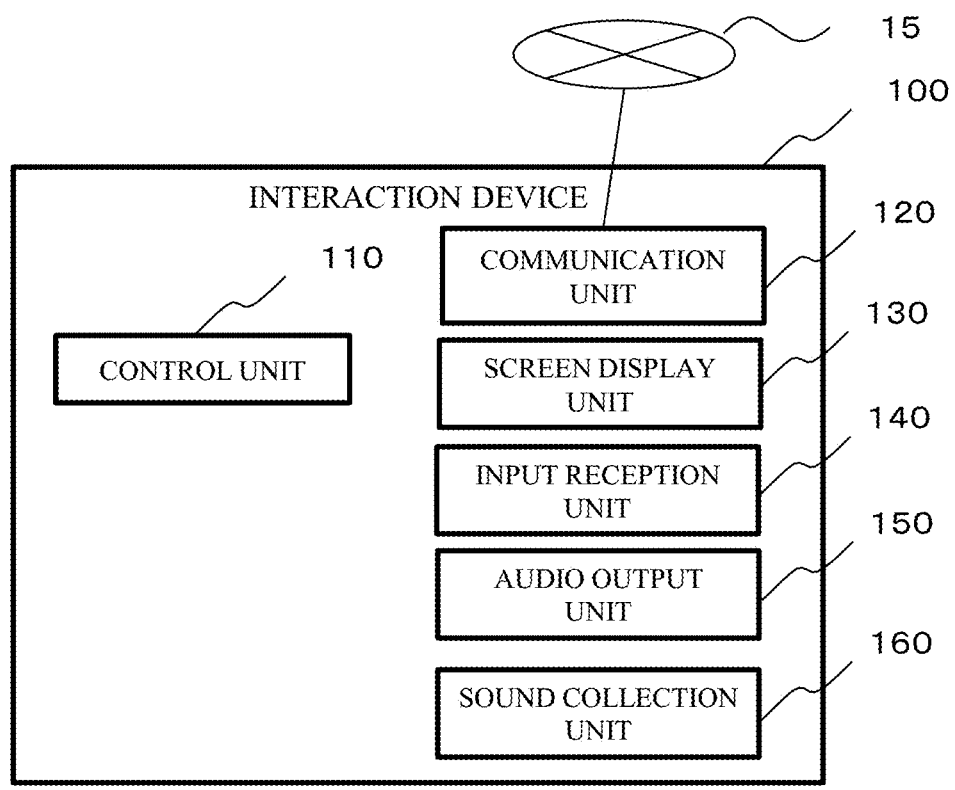
FIG. 2 is a diagram illustrating a configuration example of an interaction device.

As illustrated in FIG. 2, the interaction device 100 is composed of a control unit 110, a communication unit 120, a screen display unit 130, an input reception unit 140, an audio output unit 150, and a sound collection unit 160. The interaction device 100 is a terminal that communicates with a customer. For example, the interaction device 100 is typically a navigation device or the like; however, this does not set any limitation and the interaction device 100 may be an electronic information terminal such as a personal computer device, a mobile phone terminal, a tablet computer terminal, a PDA (Personal Digital Assistant) or the like.

The control unit 110 executes basic control of the interaction device 100. For example, the control unit 110 manages power of the entire interaction device 100 and serves as a supervisor in control, task management or the like of various devices with an operating system.

The communication unit 120 communicates with other devices such as the interaction history management device 200, the external service provision device 300 or the like via the network 15.

The screen display unit 130 displays an input screen or an output screen based on screen information. For example, the screen display unit 130 displays a list from which an individual interaction in history information can be selected, result information of success or failure of history deletion, or the like on a predetermined screen.

The input reception unit 140 receives an input of information required to manage the history of input by audio or screen operation. Further, when the received input is an audio input, the input reception unit 140 transmits the input audio information to the interaction history management device 200.

The audio output unit 150 outputs by audio a reply, such as a processing result according to the input instruction by audio, in response to the input by audio or the like.

The sound collection unit 160 collects audio information such as a speech to input information within a predetermined space. An outline of the configuration of the interaction device 100 has been described.

Figure 3:
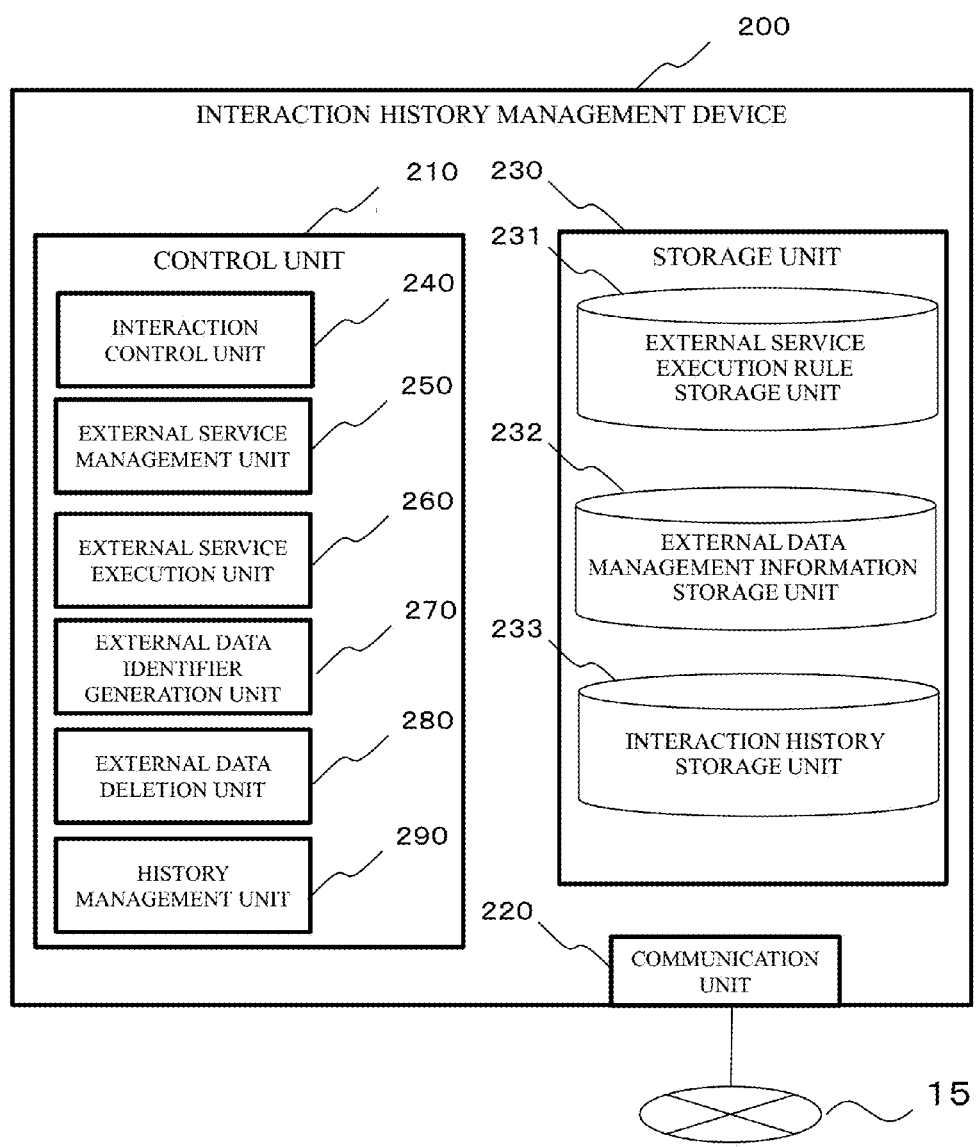
FIG. 3 is a diagram illustrating a configuration example of an interaction history management device.

As illustrated in FIG. 3, the interaction history management device 200 is composed of a control unit 210, a communication unit 220, and a storage unit 230. Here, the storage unit 230 may be provided in another device which is connected via the network 15 and the interaction history management device 200 may access information stored in the storage unit 230 via the network 15. The interaction history management device 200 is typically a server device; however, this does not set any limitation and the interaction history management device 200 may be an electronic information terminal such as a personal computer, a mobile phone terminal, a tablet computer terminal, a PDA or the like.

The storage unit 230 includes an external service execution rule storage unit 231 that stores an execution rule for determining whether or not an external service is a process that needs a corresponding identifier to be associated with an interaction history, an external data management information storage unit 232, and an interaction history storage unit 233.

FIG. 4 is a diagram illustrating a structure of data stored in the external service execution rule storage unit 231. The external service execution rule storage unit 231 includes a service identifier 231a for identifying a service, a service name 231b for identifying a service name, an external data management item 231c for identifying an item which requires external data management, an external data management non-necessity item 231d for identifying an item which does not require external data management, and a management parameter 231e for identifying a parameter which is required in a service.

FIG. 5 is a diagram illustrating a structure of data stored in the external data management information storage unit 232. The external data management information storage unit 232 includes an external data identifier 232a for identifying external data generated by an external service, a service identifier 232b for identifying the external service which has generated the external data, and additional information 232c which is a parameter for identifying the external data in the external service.

FIG. 6 is a diagram illustrating a structure of data stored in the interaction history storage unit 233. The interaction history storage unit 233 includes an interaction serial number 233a for identifying the order of speeches, a time 233b for identifying the time of the speech, a category 233c for identifying a source of the speech, a content 233d for identifying a speech content, a service type 233e for identifying a service related to the speech, and an external data identifier 233f for identifying external data generated by the external service executed according to the speech.

Referring back to FIG. 3, the explanation will be given. An interaction control unit 240 receives an operation input by audio and generates a reply by audio in response to the operation. For example, the interaction control unit 240 acquires audio information with the interaction device 100 via the communication unit 220 and the network 15, identifies a content of the operation input by checking with a predetermined scenario, and gives audio information as a reply according to the scenario which is used to collect some information required in the operation.

An external service management unit 250 executes management of the external service. Concretely, the external service management unit 250 executes a management process such as a modification of a registered content of the external service execution rule storage unit 231.

An external service execution unit 260 executes an external service. Concretely, the external service execution unit 260 identifies the external service to be executed based on the operation input received by the interaction control unit 240, determines whether or not the service corresponds to the management item by referring to the external service execution rule storage unit 231, and executes the service. Further, the external service execution unit 260 determines success or failure of the executed external service regarding the management item and, if it is successful, stores a unique identifier to the interaction history storage unit 233 as associating with the reply generated by the interaction control unit 240.

An external data identifier generation unit 270 generates an identifier for identifying information generated in the executed external service when a request is received during the execution of the external service.

An external data deletion unit 280 executes deletion when receiving a deletion request of information generated by the executed external service. Here, the external data deletion unit 280 identifies the service identifier 232b and the additional information 232c corresponding to the external data identifier 232a included in the interaction history to be deleted by referring to the external data management information storage unit 232, composes an electronic text to request a process to delete the external data, and gives the electronic text to the external service provision device 300 via the communication unit 220.

A history management unit 290 accumulates history of speeches transmitted or received by the interaction control unit 240. Further, the history management unit 290 outputs a list of history when receiving a request to display the accumulated history, and executes deletion when receiving an instruction to delete a part of the history. In this case, when receiving an instruction to delete the history of a speech for which external data to be managed has been generated, the history management unit 290 checks whether or not the external data is to be deleted and instructs the external data deletion unit 280 to delete the external data according to need.

The communication unit 220 communicates with other devices such as the interaction device 100 and the external service provision device 300 or the like via the network 15. The outline of the configuration of the interaction history management device 200 has been described.

Referring back to FIG. 1, the explanation will be given. The external service provision device 300 is communicatably connected via the network 15 to the interaction device 100 and the interaction history management device 200 which are other devices. The external service provision device 300 provides, as an external service, a calendar service by the calendar service control unit 350 to other devices, for example. In addition, the external service provision device 300 may provide other various services including a short sentence posting service such as Twitter, an article posting service such as a web blog, and an audio conversation service such as an audio chat or may provide multiple services among various services as the external services.

A user 10 as a customer of the interaction history management system 1 can use a predetermined service provided by the external service provision device 300 by giving an operation instruction by audio to the interaction device 100. Further, in order to delete external data related to the service which has been used, by specifying the data to be deleted via the interaction device 100, the external data to be deleted and the interaction history including the operation instruction given when the external data is generated can be deleted in an associated manner.

Figure 7:
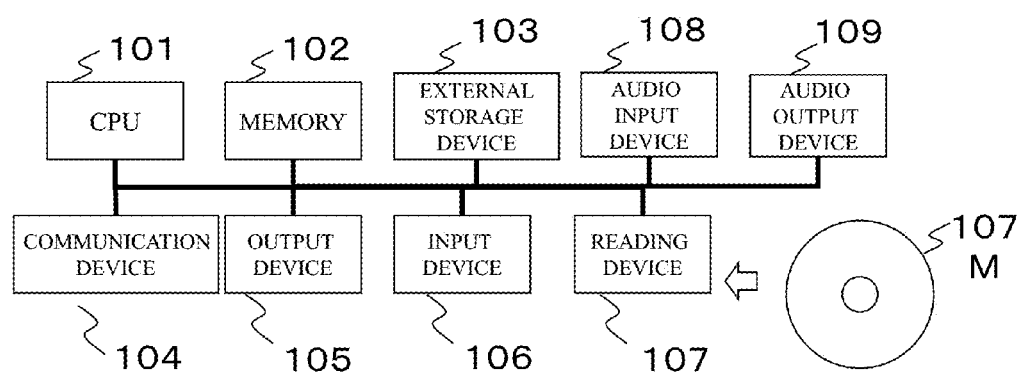
FIG. 7 is a diagram illustrating a hardware configuration of the interaction device.

FIG. 7 is a diagram illustrating a hardware configuration of the interaction device 100. Here, the interaction device 100 may not have to directly access to the network 15 and may access via a communication network with a circuit switching such as a mobile phone carrier, or a wireless communication network for data transmission, or the like.

The interaction device 100 is composed of a CPU (Central Processing Unit) 101, a memory 102, an external storage device 103, a communication device 104, an output device 105, an input device 106, a reading device 107, an audio input device 108, an audio output device 109, and a bus that connects one another.

The CPU 101 is a unit to execute various calculations. The CPU 101 executes various processes by executing predetermined programs loaded in the memory 102 from the external storage device 103 or the like.

The memory 102 stores programs which are executed by the CPU 101 and data which is used in the execution of the programs.

The external storage device 103 is a non-volatile storage device such as a Hard Disk Drive, an SSD (Solid State Drive), or a flash memory, which can store digital information.

The communication device 104 is an NIC (Network Interface Card) for connecting to the network 15 or the like.

The output device 105 is a device for generating output information, such as a display or a printer. Here, the display may be, for example, a CRT display, an LCD (Liquid Crystal Display), an organic EL (Electro-Luminescence) display and the like.

The input device 106 is a device for receiving input information, such as a pointing device such as a keyboard, a mouse or the like.

The reading device 107 is a device for reading information of a portable storage medium 107M with portability such as a CD-ROM or the like. Here, the reading device 107 is not an essential component and may not be included in the interaction device 100.

The audio input device 108 is a sound collection device such as a microphone or the like, which receives input information by audio.

The audio output device 109 is a device such as a speaker, which receives output information by audio and outputs by audio.

The above described control unit 110 is realized by a program that causes the CPU 101 to execute a process. This program is stored in the portable storage medium 107M which is read by the external storage device 103, the memory 102, or the reading device 107, loaded in the memory 102 when executed, and executed by the CPU 101.

Further, the communication unit 120 is realized by the communication device 104. The screen display unit 130, the input reception unit 140, the audio output unit 150, and the sound collection unit 160 are respectively realized by the output device 105, the input device 106, the audio output device 109, and the audio input device 108.

The hardware configuration of the interaction device 100 according to the present embodiment has been described above. However, the descriptions do not set any limitation and the interaction device 100 may be composed of other hardware. For example, it may be composed so as to connect to a network such as the Internet, a LAN, a WAN, or the like, receive movie or audio information input via another device, and transmit the received information to the interaction history management device 200.

Further, the interaction history management device 200 also has a hardware configuration substantially same as that of the interaction device 100, except that the audio input device and the audio output device are not needed.

The interaction control unit 240, the external service management unit 250, the external service execution unit 260, the external data identifier generation unit 270, the external data deletion unit 280, and the history management unit 290 of the interaction history management device 200 are realized by a program that causes the CPU included in the interaction history management device 200 to execute a process. This program is stored in a portable storage medium that is read by an external storage device, a memory, or a reading device, loaded in a memory when executed, and executed by the CPU.

Further, the communication unit 220 is realized by the communication device of the interaction history management device 200. The storage unit 230 is realized by a memory, an external storage device, a reading device, and a portable storage medium.

An example of the hardware configuration of the interaction history management device 200 according to the present embodiment has been described above. However, the above descriptions do not set any limitation and the interaction history management device 200 may be composed of other hardware. For example, using a distributed computing technology, the interaction history management device 200 may be realized by a plurality of counting machines. Further, each piece of information stored in the storage unit 230 may be integrated information that is collected information stored in other server devices or an external storage device connected to the network or may be updated by receiving data transmission from a related party at a predetermined timing.

The external service provision device 300 also has the substantially same hardware configuration as that of the interaction history management device 200. Further, the calendar service control unit 350 is realized by the CPU, the memory, the communication device or the like included in the external service provision device 300.

[Explanation of Operation]

Figure 8:
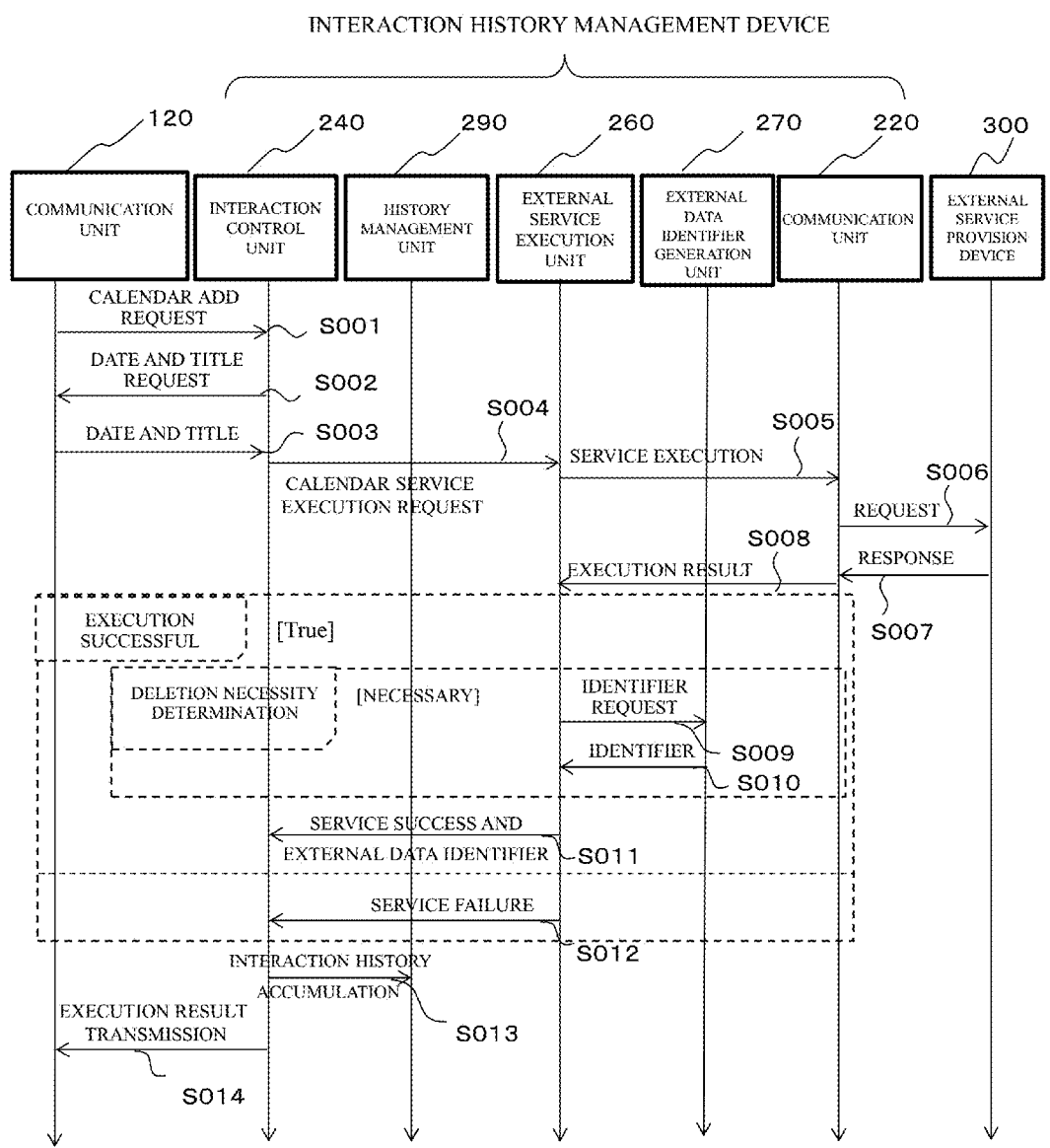
FIG. 8 is a diagram illustrating a process flow of an external service execution process.

Next, operation of an external service execution process of the interaction history management device 200 according to the present embodiment will be explained taking an execution of a calendar service as an example as referring to FIG. 8. Here, in FIG. 8, a part of the process from a speech by the customer to an audio data transmission to the interaction control unit 240 and the process of a transmission of a reply from the interaction control unit 240 to the customer is omitted. An outline of the omitted process will be described first.

First, the user 10 as a customer starts a speech to the interaction device 100. Then, the input reception unit 140 acquires audio analog data. Next, the input reception unit 140 converts the received analog audio into digital data and gives the data to the communication unit 120. The communication unit 120 transmits the digitalized audio data to the interaction control unit 240 of the interaction history management device 200. This is the transmission process of audio data from the user 10 as a customer to the interaction control unit 240.

Further, regarding the reply transmission process executed by the interaction control unit 240 to the user 10 as a customer, the interaction control unit 240 checks the received audio data with the predetermined scenario and identifies reply information corresponding to the scenario. Then, the interaction control unit 240 transmits the reply information to the interaction device 100 via the communication unit 220. The communication unit 120 in the interaction device 100 gives the received data to the audio output unit 150. The audio output unit 150 executes an analog-conversion on the given reply information and reproduces the audio information. The above processes are the omitted processes. With these processes, the user 10 as a customer can execute an interaction by audio.

Referring back to FIG. 8, the explanation will be given. In the interaction history management device 200, firstly, the interaction control unit 240 receives audio information as a calendar addition request from the communication unit 120 of the interaction device 100 (step S001). For example, the interaction control unit 240 receives audio information such as "Add an event for tomorrow."

Then, the interaction control unit 240 identifies that it is the predetermined process request based on an audio recognition and outputs a reply that encourages a speech of information required as a parameter, to meet the requested scenario of the predetermined process (step S002). For example, the interaction control unit 240 identifies that it is a calendar addition request to meet the predetermined scenario and generates reply information that requires information of data and a title. Here, it is assumed that the reply information is audio information; however, this example does not set any limitation and it may be screen display information or may be both of audio information and screen display information.

Then, the interaction control unit 240 receives information to be used as a parameter as audio information from the communication unit 120 of the interaction device 100 (step S003). For example, the interaction control unit 240 receives audio information such as "A meeting at 15:00 tomorrow."

The interaction control unit 240 analyzes the received audio information based on an audio recognition, identifies the parameter (scheduled date and time, title), and requests the execution of the relevant service (calendar service) to the external service execution unit 260 (step S004).

The external service execution unit 260 causes the communication unit 220 to transmit an execution request of the external service to add an event to a predetermined external service provision device 300 that provides the relevant service (step S005).

The communication unit 220 transmits an execution request of the external service to the predetermined external service provision device 300 (step S006). Then, the communication unit 220 receives a response of the request from the external service provision device 300 (step S007). The response includes information that identifies the execution result (success or failure) of the external service.

Then, the communication unit 220 notifies the execution result to the external service execution unit 260 (step S008). Here, the external service execution unit 260 determines whether or not the execution result is successful and informs the interaction control unit 240 that the service execution has failed when the execution has failed (step S012).

When the service execution is successful, the external service execution unit 260 determines that the necessity of managing the deletion of the external data or the like. Concretely, regarding the executed external service, the external service execution unit 260 identifies the service identifier 231*a* corresponding to the external service execution rule storage unit 231 and identifies whether or not the process corresponds to the external data management item 231*c*. When the process corresponds to the external data management item 231*c*, it is determined that management is needed and the external service execution unit 260 requests an identifier to the external data identifier generation unit 270 (step S009). Then, the external service execution unit 260 receives the identifier generated by the external data identifier generation unit 270 (step S010). Then, when the execution is successful and management is needed, the external service execution unit 260 informs the received identifier as an external data identifier to the interaction control unit 240 (step S011).

The interaction control unit 240 executes accumulation of the interaction history (step S013). Concretely, the interaction control unit 240 stores the content of the interaction to the interaction history storage unit 233 and associates the history of the speech immediately before the execution of the external service with the external data identifier to store the history in the interaction history storage unit 233.

Then, the interaction control unit 240 transmits the execution result of the external service requested by the user 10 as a customer to the communication unit 120 of the interaction device 100 (step S014).

The flow of the external service execution process according to the first embodiment has been described above. With the external service execution process, the user 10 as a customer can add schedule information as external data to the calendar service control unit 350 as an external service after associating with the identifier so that the data can be deleted.

Next, an interaction history management process such as an execution of interaction history deletion or the like will be explained with reference to FIGS. 9 to 14.

Figure 9:
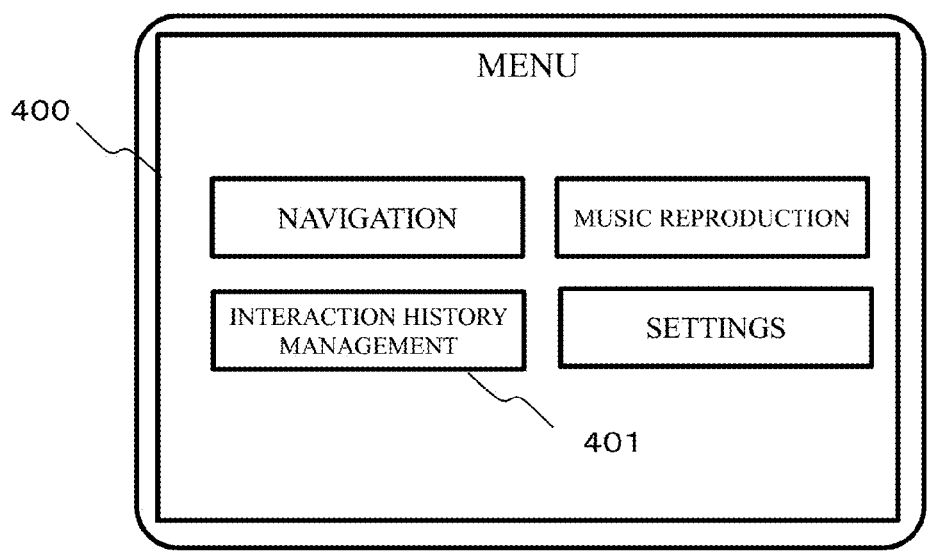
FIG. 9 is a diagram illustrating an example of a start menu screen of an interaction history management process.

FIG. 9 is a menu screen 400 which is displayed on the interaction device 100. In the menu screen 400, in addition to an interaction history management button 401 for receiving an execution instruction of the interaction history management process, various buttons for calling up other functions included in the interaction device 100 (for example, a navigation button, a music reproducing button, a setting button, etc.).

Figure 10:
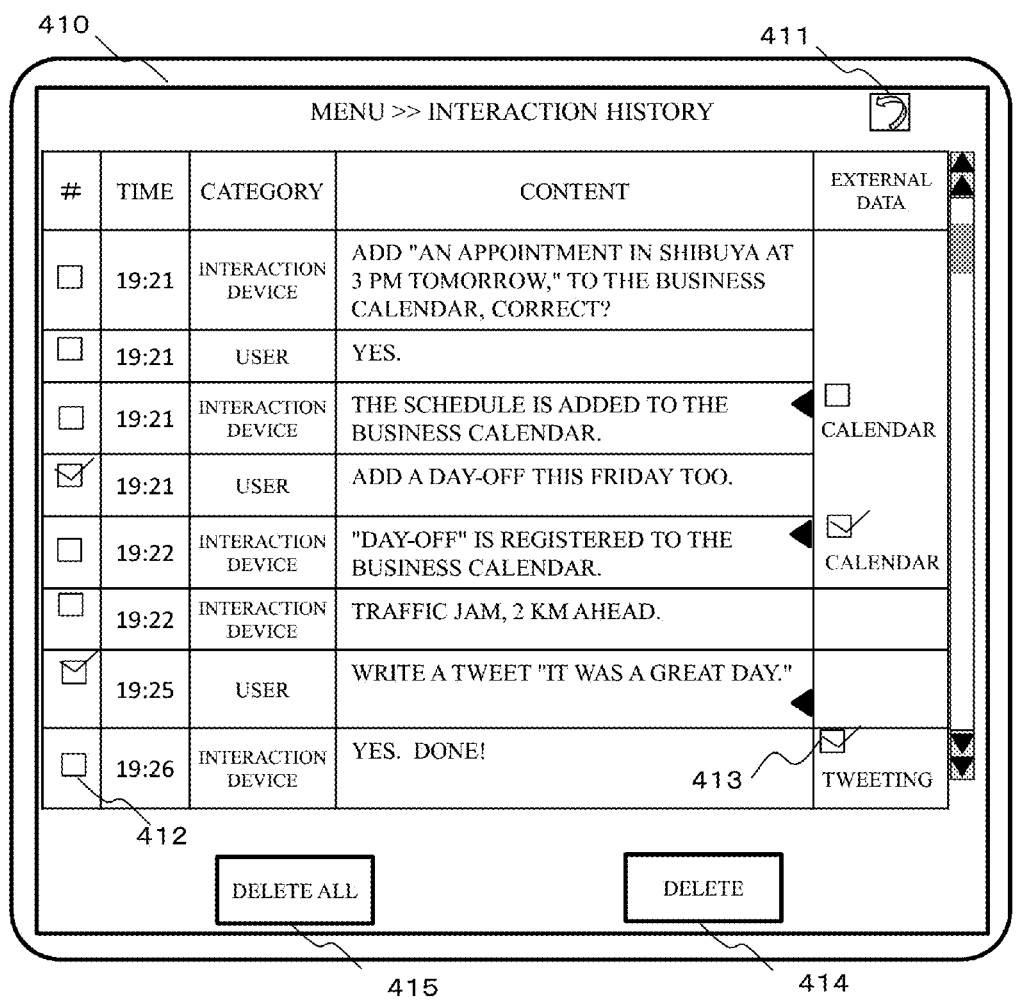
FIG. 10 is a diagram illustrating an example of a detail input screen of the interaction history management process.

FIG. 10 is a diagram illustrating an example of an interaction history management screen 410 which is displayed when an input on the interaction history management button 401 of FIG. 9 is accepted, and used by the user 10 to manage the interaction history and the external data. As illustrated in FIG. 10, the interaction history management screen 410 includes a list of interaction execution times, categories of speakers, interaction contents, external data recorded in the external service which is called up by the interaction, or the like. In addition to the above, the interaction history management screen 410 includes a speech selection box 412 for receiving a selection of speech that the user intends to delete, an external data selection box 413 for receiving a selection of the external data to be deleted, a delete button 414 for receiving an instruction to start the deletion of the data selected in the speech selection box 412 and the external data selection box 413, a delete all button 415 for receiving an instruction to delete the all recorded speech and all pieces of external data, and a return button 411 for receiving an instruction to return the screen to the menu screen 400 of FIG. 9.

Here, regarding the speech selected in the speech selection box 412 on the interaction history management screen 410, when there is external data generated during the external service executed based on the speech, the screen display unit 130 controls so that the external data selection box 413 of the external data is also selected automatically. Here, when the audio content related to the reply immediately after the execution of the external service is deleted from the interaction history storage unit 233, at least a part of the audio content before the time of the speech executed may be also deleted from the interaction history storage unit 233 in addition to the audio content related to the reply associated with the external data identifier. Further, on the contrary, regarding the external data selected by the external data selection box 413, the screen display unit 130 may control so that the speech selection box 412 of the speech related to the execution of the external service in which the external data is generated is automatically selected.

Figure 11:
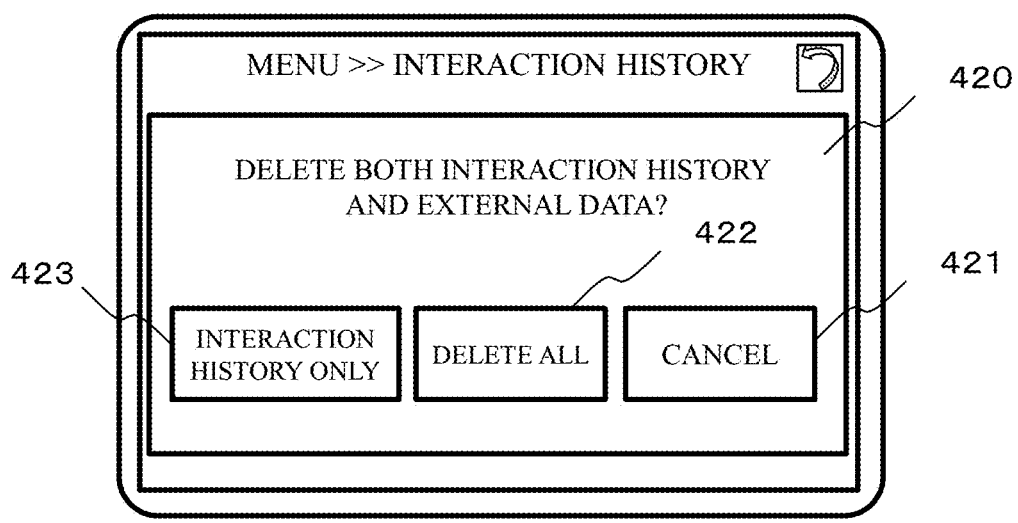
FIG. 11 is a diagram illustrating an example of an execution confirmation screen of the interaction history management process.

FIG. 11 is a diagram illustrating an example of a deletion content confirmation screen 420 which is displayed when an input is received on the delete button 414 of the interaction history management screen 410. The deletion content confirmation screen 420 includes an interaction history only button 423 for accepting a deletion instruction for only the interaction history, a delete all button 422 for accepting a deletion instruction for both of the interaction history and the external data, and a cancel button 421 for accepting an instruction for ending the interaction history management process. When an input to the interaction history only button 423 or delete all button 422 is accepted, the deletion of corresponding history information and external data is executed by the history management unit 290 and the external data deletion unit 280.

Figure 12:
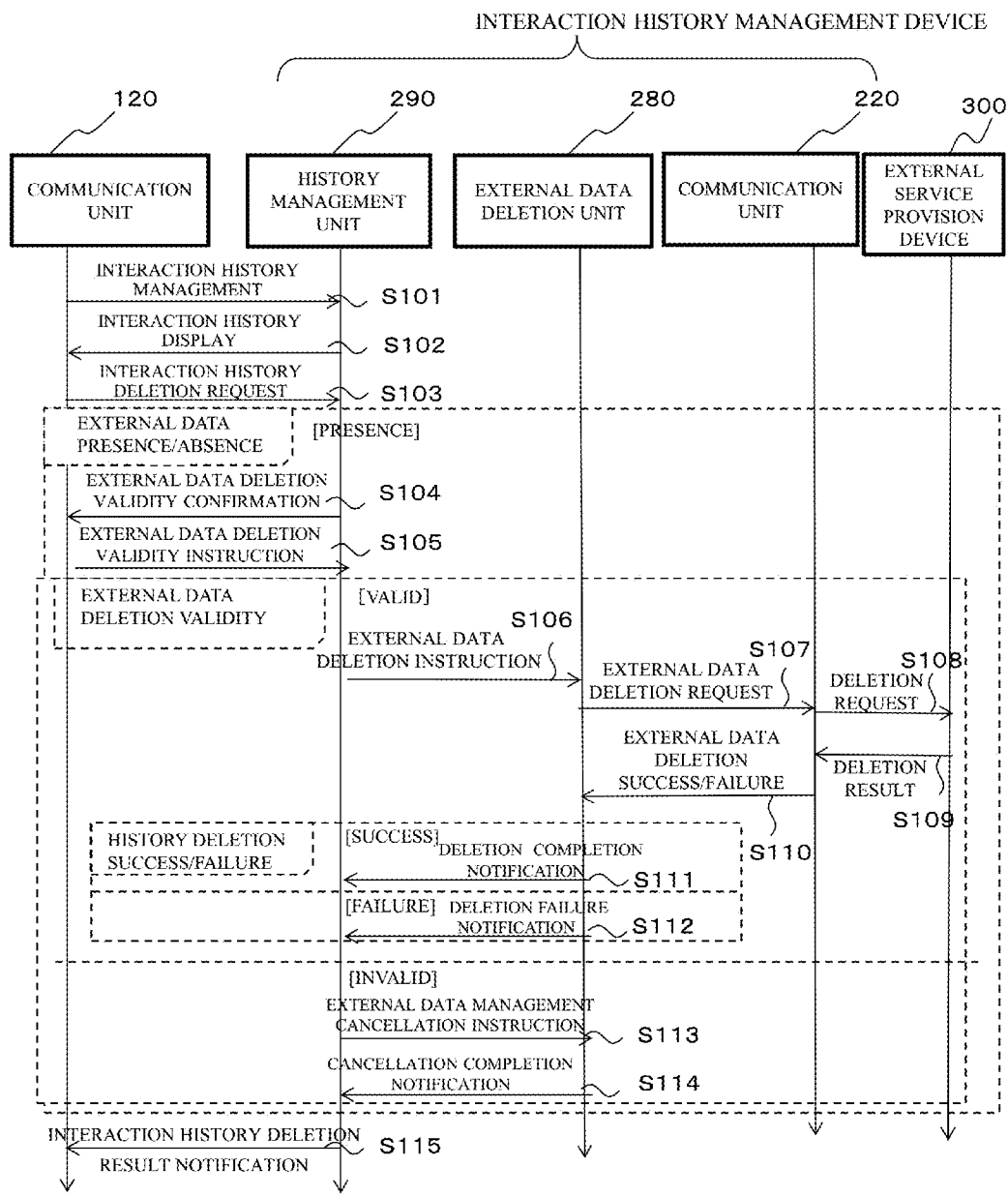
FIG. 12 is a diagram illustrating a process flow of the interaction history management process.

FIG. 12 is a diagram illustrating a flow of the interaction history management process.

Firstly, the history management unit 290 accepts an interaction history management instruction (step S101). Concretely, the history management unit 290 accepts an input to the interaction history management button 401 of the menu screen 400 displayed on the interaction device 100.

Then, the history management unit 290 transmits interaction history display information to the communication unit 120 of the interaction device 100 (step S102). Concretely, the history management unit 290 reads information except for the service type 233e from the interaction history storage unit 233 and composes screen information of the interaction history management screen 410. Then, the history management unit 290 transmits the composed screen information to the communication unit 120 of the interaction device 100.

Then, the history management unit 290 accepts an interaction history deletion request (step S103). Concretely, the history management unit 290 accepts information to identify the selected speech selection box 412 and the selected external data selection box 413 of the interaction history management screen 410 displayed on the interaction device 100.

Then, the history management unit 290 judges whether or not there is any selection in the external data selection box 413 according to the received request. When there is no selection, the history management unit 290 deletes the history of the speech according to the selected speech selection box 412 and transmits information that indicates the interaction history deletion result to the communication unit 120 (step S115).

When there is a selection in the external data selection box 413, the history management unit 290 executes an external data deletion validity confirmation (step S104). Concretely, the history management unit 290 composes screen information of the deletion content confirmation screen 420 and transmits the composed screen information to the communication unit 120 of the interaction device 100.

Then, the history management unit 290 accepts a deletion validity instruction for the external data (step S105). Concretely, the history management unit 290 receives an instruction that the external data is to be deleted when an input is accepted by the delete all button 422 of the deletion content confirmation screen 420, and accepts an instruction that the external data is not to be deleted when an input is accepted by the interaction history only button 423.

When accepting the instruction that the external data is not to be deleted, the history management unit 290 instructs the external data deletion unit 280 to cancel the external data management (step S113). When accepting the external data management cancellation instruction, the external data deletion unit 280 deletes the external data identifier 232a, service identifier 232b and additional information 232c which are associated with the speech to be deleted from the external data management information storage unit 232 and transmits a cancellation completion notification to the history management unit 290 (step S114). Then, the history management unit 290 executes step S115.

When accepting the instruction that the external data is to be deleted, the history management unit 290 instructs the external data deletion unit 280 to delete the external data (step S106). Concretely, the history management unit 290 identifies the external data identifier of the selected external data selection box 413 by reading the external data identifier 233f in the interaction history storage unit 233. Then, the history management unit 290 identifies an external data identifier 232a in the external data management information storage unit 232 corresponding to the identified external data identifier 233f and also identifies corresponding service identifier 232b, and additional information 232c. Then, the history management unit 290 gives the external data and additional information 232c to be deleted to the external data deletion unit 280 and requests a service to delete the external data.

The external data deletion unit 280 causes the communication unit 220 to transmit an execution request of the external service to delete a schedule toward the predetermined external service provision device 300 that provides the corresponding service (step S107).

The communication unit 220 transmits an external service execution request (deletion request) to the predetermined external service provision device 300 (step S108). Then, the communication unit 220 receives a response from the external service provision device 300 in response to the request (step S109). The response includes information that identifies an external service execution result (deletion success/failure).

Then, the communication unit 220 notifies the external data deletion success/failure to the external data deletion unit 280 (step S110). Here, the external data deletion unit 280 judges whether or not it is indicated that the external data deletion has succeeded.

When the external data deletion has succeeded, the external data deletion unit 280 informs the history management unit 290 that the external data deletion has succeeded (step S111). Then, the history management unit 290 deletes the history of the speech of the selected speech selection box 412 and transmits information that indicates the interaction history deletion result to the communication unit 120 (step S115).

When the external data deletion has failed, the external data deletion unit 280 informs the history management unit 290 that the external data deletion has failed (step S112). Then, the history management unit 290 deletes the history of the speech of the selected speech selection box 412 and transmits information that indicates the interaction history deletion result to the communication unit 120 (step S115).

The flow of the interaction history management process has been described above. With this interaction history management process, the user 10 can easily and smoothly delete an interaction history and external data generated in an external service which is executed during the interaction.

Figure 13:
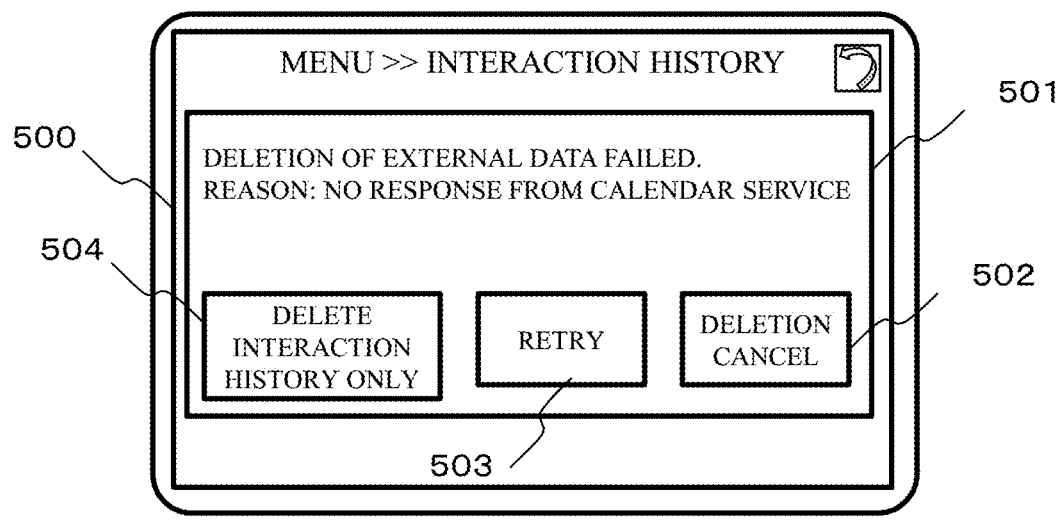
FIG. 13 is a diagram illustrating an example of an error screen of the interaction history management process.

FIG. 13 illustrates an example of an external data deletion error screen 500 that is displayed as a screen on the interaction device 100 when the deletion failure notification is notified to the history management unit 290 in step S112 of the interaction history management process and the reason of the deletion failure is because there is no response from the calendar service control unit 350.

The external data deletion error screen 500 includes a message display area 501 for displaying a message indicating a reason of a deletion error, an interaction history only delete button 504 for accepting a deletion instruction for only interaction history, a retry button 503 for accepting a retry instruction to retry the deletion, and a cancel button 502 for accepting an instruction to end the interaction history management process.

The message display area 501 displays messages, for example, "External data deletion failed. Reason: No response from calendar service" or the like.

When an input to the interaction history only delete button 504 is accepted, the deletion of the corresponding history information is executed by the history management unit 290 and the external data deletion unit 280.

When an input by the user 10 to the interaction history only delete button 504 is accepted, the history management unit 290 executes step S115 to delete only the interaction history and ends the interaction history management process.

When an input by the user 10 to the retry button 503 is accepted, the history management unit 290 retries the process from step S106.

When an input by the user 10 to the cancel button 502 for accepting an instruction to end the interaction history management process is accepted, the history management unit 290 ends the interaction history management process.

Figure 14:
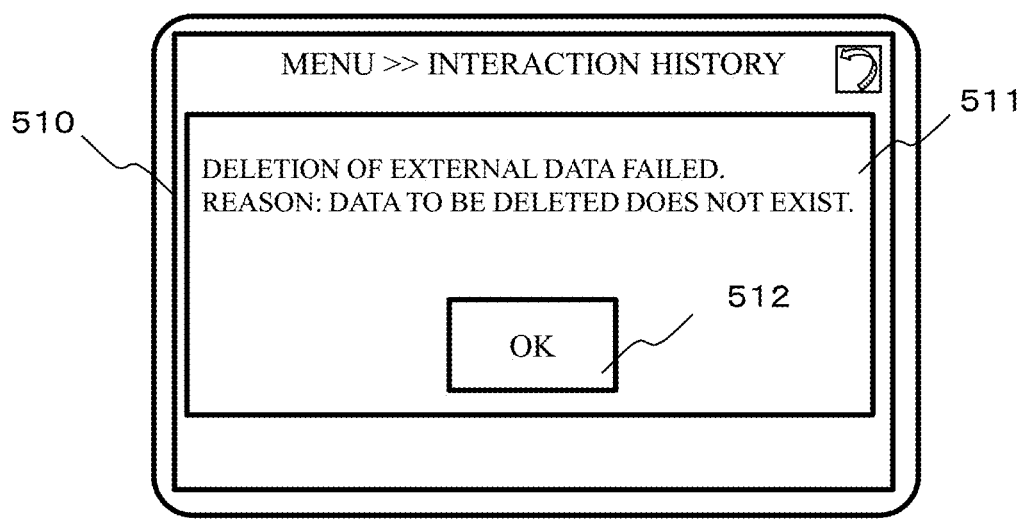
FIG. 14 is a diagram illustrating another example of the error screen of the interaction history management process.

FIG. 14 illustrates another example of the external data deletion error screen 510 that is displayed as a screen of the interaction device 100 when the deletion failure notification is notified to the history management unit 290 in step S112 of the interaction history management process and the reason of the deletion failure is that the external data does not exist.

The another external data deletion error screen 510 includes a message display area 511 for displaying a message that indicates a reason of the deletion error and an OK button 512 for accepting an instruction to continue the deletion process.

The message display area 511 displays a message, for example, "External data deletion failed. Reason: Data to be deleted does not exist." or the like.

When an input to the OK button 512 is accepted, the history management unit 290 executes the process from step S113 to delete only the interaction history and ends the interaction history management process.

The process flow of the interaction history management process according to the first embodiment has been described above. With the interaction history management process, the user 10 as a customer can delete schedule information which is external data created by the calendar service control unit 350 serving as an external service as being associated with the interaction history.

The interaction history management system 1 according to the first embodiment of the present invention has been described above. With the present embodiment, when the external data generated by the external service is separately deleted by a system or the like that is not included in the interaction history management system 1, only the interaction history is deleted without deleting the external data; however, this does not set any limitation. For example, the presence or absence of the external data may be checked at a predetermined timing.

Figure 15:
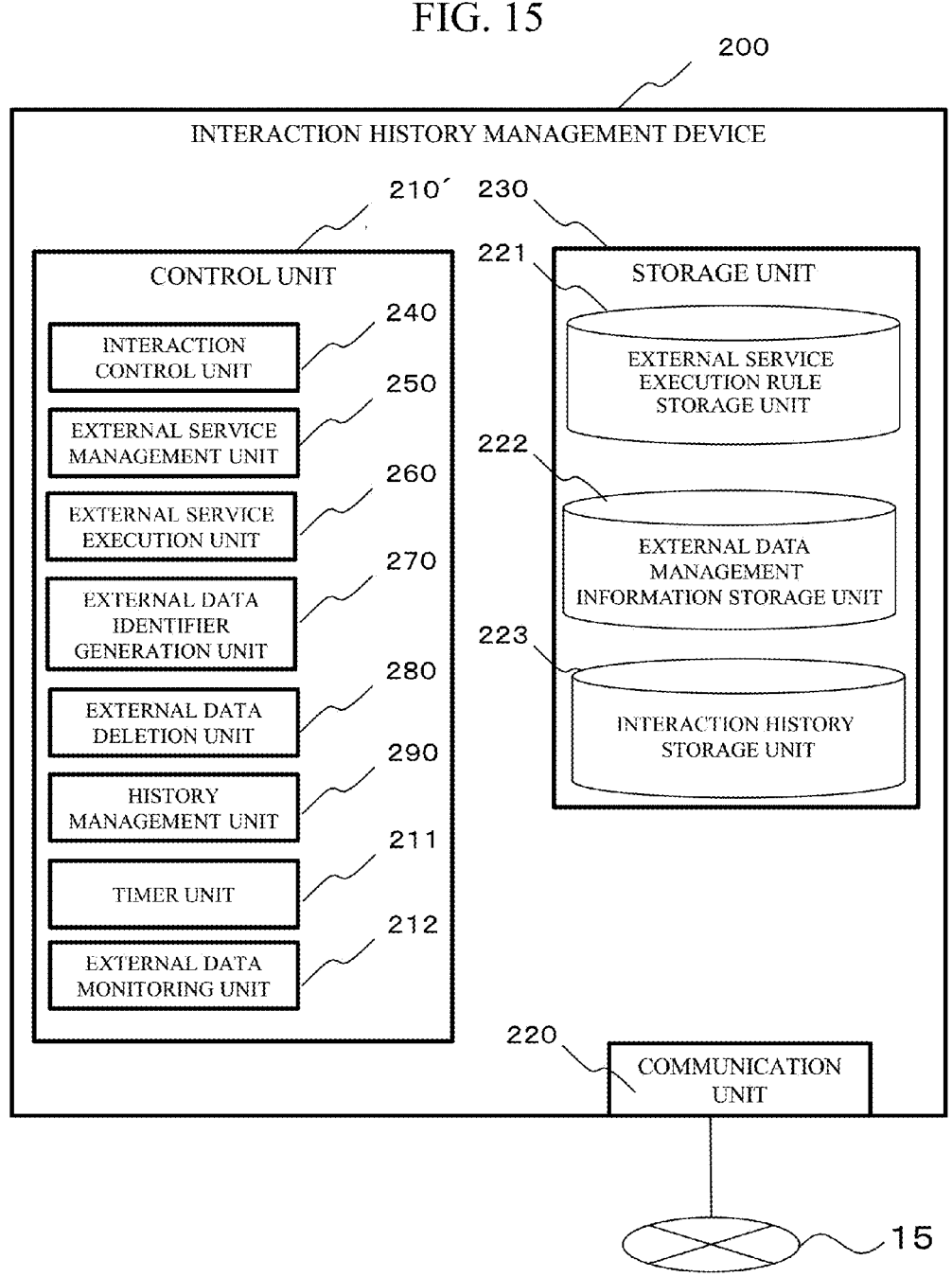
FIG. 15 is a diagram illustrating a configuration example of an interaction history management device according to a second embodiment.

FIG. 15 is a diagram illustrating a configuration example of an interaction history management device 200 of an interaction history management system 1 according to a second embodiment of the present invention. According to the second embodiment, the interaction history management device 200 has a configuration same as that in the first embodiment for the configuration having the same reference number as those in FIG. 3; however, there is a difference that a control unit 210' includes a timer unit 211 and an external data monitoring unit 212. In the following, the configuration that makes the difference will be explained focusing on the difference from the first embodiment.

According to the second embodiment, the interaction history management device 200 includes, in the control unit 210', the timer unit 211 and the external data monitoring unit 212. The timer unit 211 detects passing of a predetermined period of time and informs the external data monitoring unit 212, which is another processing unit, of the time passing as a timer notification. The external data monitoring unit 212 confirms if there is a piece of external data generated in a result of execution of an external service and, when there is no more data, transmits a deletion completion notification to the history management unit 290.

Figure 16:
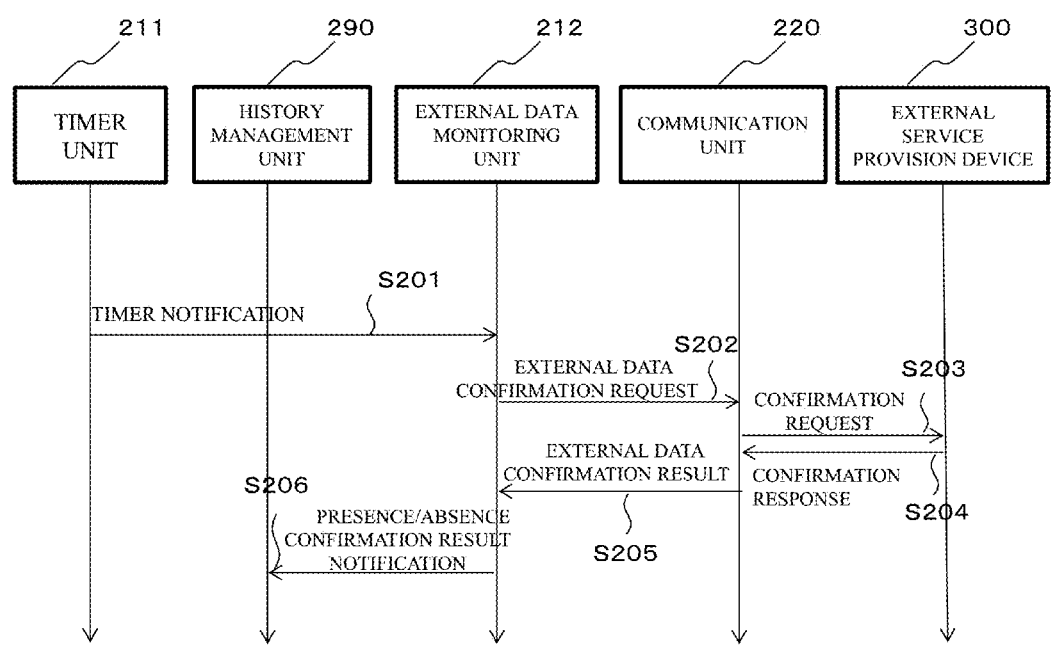
FIG. 16 is a diagram illustrating a process flow of an external data presence/absence confirmation process according to the second embodiment.

FIG. 16 is a diagram illustrating a flow of an external data deletion detection process according to the second embodiment.

Firstly, the timer unit 211 executes a timer notification to the external data monitoring unit 212 every time detecting passing of the predetermined period of time (step S201).

Then, the external data monitoring unit 212 executes an external data confirmation request to cause the communication unit 220 to transmit an execution request for an external service of checking the presence or absence of schedule toward the predetermined external service provision device 300 that provides a corresponding service (step S202).

The communication unit 220 transmits an external service execution request (presence/absence confirmation request) to the predetermined external service provision device 300 (step S203). Then, the communication unit 220 receives a confirmation response from the external service provision device 300 in response to the request (step S204). The confirmation response includes information for identifying an external service execution result (presence or absence).

Then, the communication unit 220 notifies the external data confirmation result to the external data monitoring unit 212 (step S205). Here, the external data monitoring unit 212 judges whether or not the external data exists.

Then, the external data monitoring unit 212 notifies the external data presence/absence confirmation result to the history management unit 290 (step S206).

An example of the flow of the external data deletion detection process has been described above. With this external data deletion detection process, since the presence of the external data can be confirmed at a predetermined timing, a notification is received when the external data is deleted so that a predetermined process can be promptly executed.

The process flow of the external data deletion detection process according to the second embodiment has been described. According to the second embodiment, a deletion error can be prevented even when the external data can be separately deleted.

It is noted that the present invention is not limited by the above described embodiments and may include various modifications. For example, the above embodiments are explanations to explain the present invention clearly in detail and the present invention is not limited to what includes all the explained configurations. Further, a part of the configuration of one embodiment may be replaced with the configuration of the other embodiment and the configuration of one embodiment may be added to the configuration of the other embodiment. Further, regarding a part of the configuration of each embodiment, the configuration of the other embodiment may be added, deleted, or replaced.

Further, for example, according to the above embodiments, the interaction device 100, the interaction history management device 200, and the external service provision device 300 are respectively independent devices; however, this does not set any limitation. All of them may be provided in a same device or some of them may be provided in a same device. Further, when more than one external services are executed in a series of interactions, there may be more than one external data identifiers to be associated with each speech.

Further, regarding the above described respective configurations, functions, processing units, and processing methods, some or all of them may be realized as software by a processor that interprets and executes programs that realize the respective functions. The information such as a program, a table or a file that realizes the respective functions may be provided in a recording device such as a memory, a hard disk, or an SSD, or in a storage medium such as an IC card, an SD card, or a DVD.

Further, the above embodiments explain that the input of data related to execution of an external service is made by an audio interaction; however, when equivalent data already exists because of an output or the like from another system or the like, it may be realized by a method for connecting a storage device of the system or a storage medium that records the data and inputting the data without using the audio interaction.

Regarding the interaction history information, when the data is used in another system, the output screen provided by an input/output interface may not be always used if the systems are connected and data is transferred to a storage area which can be accessed by the other system.

Further, the control lines and the information lines are illustrated as needed in the explanations and the all control lines and information lines for the product are not necessarily illustrated. It may be assumed that almost all components are actually connected to one another.

Further, regarding the above described configurations, functions and processing units or the like, some or all of them may be realized by hardware by designing with an integrated circuit, for example. Further, the technical element of the above described embodiments may be applied by itself or may be applied by being divided into parts such as a part of a program or a part of hardware.

The present invention has been explained focusing on the embodiments above.

What is claimed is:

1. An interaction history management device comprising:
   an interaction control unit configured to accept an input of an operation by audio and generate a reply by audio in response to the operation;
   an interaction history storage unit configured to store information that identifies an audio content of the operation accepted by the interaction control unit and information that identifies an audio content of the reply generated by the interaction control unit;
   an execution unit configured to execute a predetermined process related to the operation accepted by the interaction control unit and, when the process is executed normally, store a unique identifier to the interaction history storage unit as associating with the reply generated by the interaction control unit; and an external data deletion unit configured to, when accepting an instruction to delete information used in the predetermined process by the execution unit, delete the information, identify the identifier of the predetermined process in which the information to be deleted is used, and delete at least an audio content of the reply associated with the identified identifier from the interaction history storage unit;

a time measurement unit; and an external data monitoring unit configured to request information about presence of external data to an external service, wherein when the time measurement unit detects passing of a predetermined period of time, the external data monitoring unit checks presence or absence of the information used in the predetermined process by the execution unit and, when the information does not exist, outputs a notification that notifies that the information does not exist.

2. The interaction history management device according to claim 1, comprising an execution rule storage unit configured to store execution rule information that identities whether or not the predetermined process is a process that needs to be associated with the identifier, wherein the execution unit refers to the execution rule storage unit when executing the predetermined process and, when the predetermined process to be executed is a process that needs to be associated with the identifier, stores the unique identifier to the interaction history storage unit as associating with the reply generated by the interaction control unit.

3. The interaction history management device according to claim 1, wherein, when an audio content of the reply associated with the identifier is deleted from the interaction history storage unit, the external data deletion unit deletes at least a part of audio contents previous to the time of the interaction together with the audio content of the reply associated with the identifier.

4. The interaction history management device according to claim 1, wherein the predetermined process related to the operation is a call up of a procedure of a service provided by another device, and the deletion instruction is a call up of a procedure to cancel the procedure in the service.

5. The interaction history management device according to claim 1, wherein the predetermined process related to the operation is a call up of a schedule registration procedure of a schedule service provided by another device, and the deletion instruction is a call up of a procedure to cancel a schedule in the schedule service.

6. The interaction history management device according to claim 1, wherein the predetermined process related to the operation is a call up of a posting procedure of a short sentence posting service provided by another device, and the deletion instruction is a call up of a procedure to cancel the posting in the short sentence posting service.

7. An interaction device comprising:

a sound collection unit configured to collect ambient sound;

an audio output unit configured to output sound to environment;

an interaction control unit configured to accept an input of an operation by audio via the sound collection unit, generate a reply by audio in response to the operation, and output the reply by audio via the audio output unit, an interaction history storage unit configured to store information that identifies an audio content of the operation accepted by the interaction control unit and information that identifies an audio content of the reply generated by the interaction control unit, an execution unit configured to execute a predetermined process related to the operation accepted by the interaction control unit and, when the process is executed normally, store a unique identifier to the interaction history storage unit as associating with the reply generated by the interaction control unit, an external data deletion unit configured to, when accepting an instruction to delete information used in the predetermined process by the execution unit, delete the information, identify the identifier of the predetermined process in which the information to be deleted is used, and delete at least the audio content of the reply associated with the identified identifier from the interaction history storage unit;

a time measurement unit; and an external data monitoring unit configured to request information about presence of external data to an external service, wherein when the time measurement unit detects passing of a predetermined period of time, the external data monitoring unit checks presence or absence of the information used in the predetermined process by the execution unit and, when the information does not exist, outputs a notification that notifies that the information does not exist.

8. An interaction history management method for managing an interaction history by using a computer wherein, the computer comprising:

a control unit configured to accept an input of an operation by audio and generate a reply by audio in response to the operation;

an interaction history storage unit configured to store information that identifies an audio content of the operation accepted by the control unit and information that identifies an audio content of the reply generated by the control unit, a time measurement unit; and an external data monitoring unit configured to request information about presence of external data to an external service, wherein when the time measurement unit detects passing of a predetermined period of time, the external data monitoring unit checks presence or absence of the information used in the predetermined process by the execution unit and, when the information does not exist, outputs a notification that notifies that the information does not exist; and the control unit executes:

an execution step of executing a predetermined process related to the accepted operation and, when the process is executed normally, storing a unique identifier to the interaction history storage unit as associating with the reply; and an external data deletion step of, when accepting an instruction to delete information used in the predetermined process in the execution step, deleting the information, identifying the identifier of the predetermined process in which the information to be deleted is used, and deleting at least the audio content of the reply associated with the identified identifier from the interaction history storage unit.

* * * * *